Figure 1:
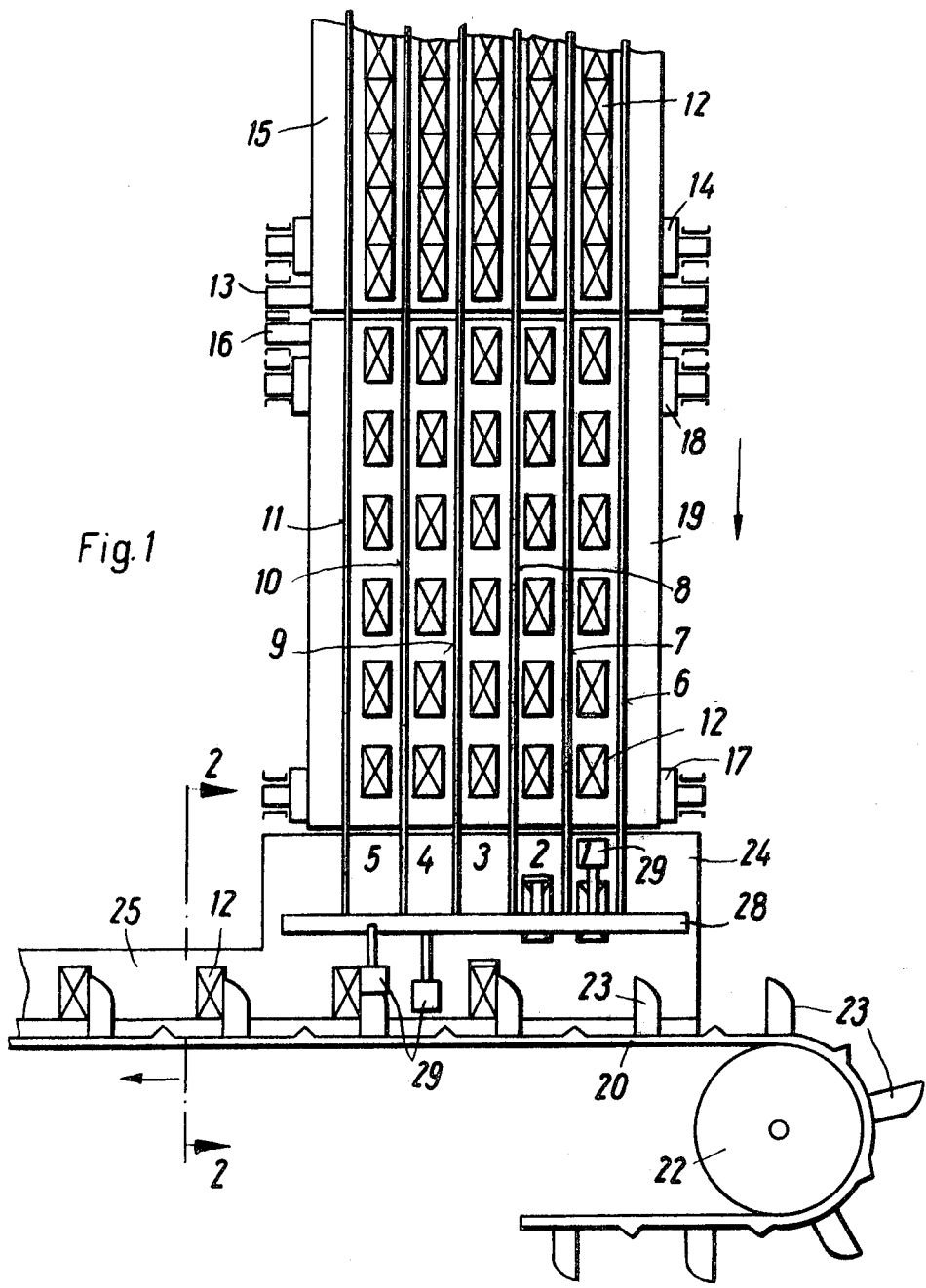

United States Patent
Revaz

[15] 3,664,483
[45] May 23, 1972

[54] METHOD OF AND APPARATUS FOR RELEASING OBJECTS TO A TRANSPORTING DEVICE

[72] Inventor: Leon Revaz, Bienne, Switzerland
[73] Assignee: Otto Hansel GmbH, Hannover, Germany
[22] Filed: Mar. 12, 1970
[21] Appl. No.: 19,010

[30] Foreign Application Priority Data

Mar. 14, 1969 Switzerland ..........................3855/69

[52] U.S. Cl..............................................................198/32
[51] Int. Cl.........................................................B65g 47/26
[58] Field of Search.......................................198/32, 25, 103

[56] References Cited

UNITED STATES PATENTS

| | | |
|---|---|---|
| 3,008,281 | 11/1961 | Wayne et al. .........................198/32 X |
| 1,545,400 | 7/1925 | Comstock............................198/32 X |
| 1,980,411 | 11/1934 | Kimball et al............................198/32 |
| 2,744,611 | 5/1956 | Jenney et al..............................198/32 |
| 2,576,369 | 11/1951 | Sticelber..............................198/32 X |

Primary Examiner—Joseph Wegbreit
Assistant Examiner—Hadd S. Lane
Attorney—Ernest G. Montague

[57] ABSTRACT

A method of and an apparatus for releasing of objects fed in a plurality of adjacent feeding channels to a transportation device with a feeding member passing in front of the terminal of the feeding channels, on which feeding member the objects are transferred to the latter in one row in series, which comprises the steps of releasing an object to the feeding member successively from each feeding channel terminal, starting with the last of the feeding channels seen in the direction of movement of the feeding channels. The feeding member is then advanced for a predetermined length from the movement of reception of an object from a feeding channel up to the moment of reception from an adjacent feeding channel. Finally, the transmission, after release of an object from the first feeding channel, of any further series of objects to the feeding member, until the object received from the first channel of the feeding member has passed the terminal of the last of the feeding channels is omitted.

11 Claims, 2 Drawing Figures

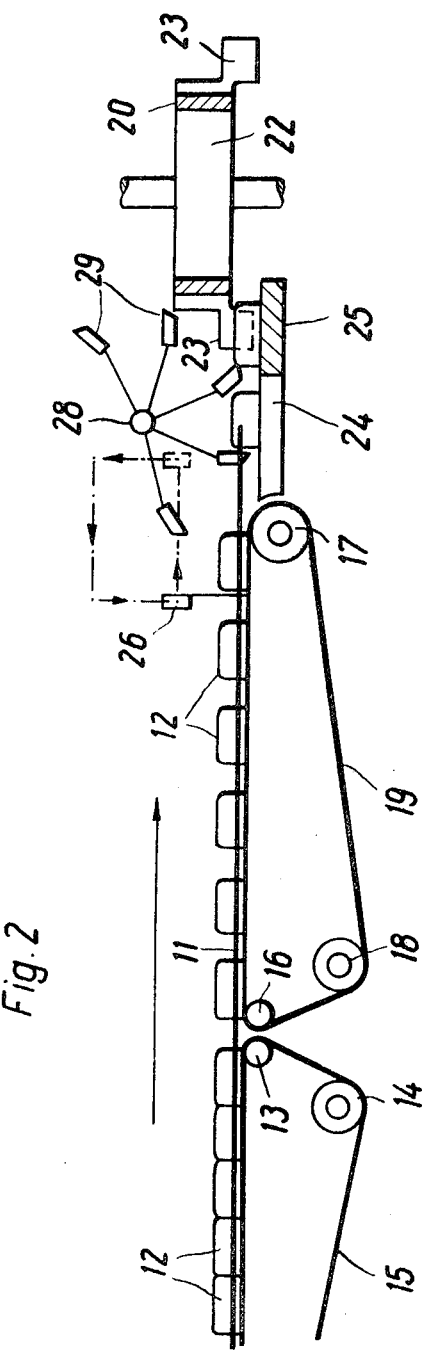

METHOD OF AND APPARATUS FOR RELEASING OBJECTS TO A TRANSPORTING DEVICE

The present invention relates to a method of and an apparatus for release of objects to a transportation device.

In particular, the present invention relates to a method of and apparatus for releasing of objects fed to a plurality of adjacent disposed feeding channels to a transportation device with a feeding member passing in front of the terminals of the channels, by means of which, the objects transmitted thereto are transported further in a one-column arrangement.

The object of the present invention, to transfer objects from a multi-channel feeding to a feeding member equipped, for example, with drivers, which feeding member transports in series the objects in a single row, has been proposed before in different fields, as for example in packing machines, in filling machines, in tool machines or in the manufacture of articles of most different types. The multi-channel feeding is caused conventionally such, that from a producing machine simultaneously several objects are ejected or when this arrangement permits the reduction of the feeding speed, which for example is required for a visual observation of the fed objects. In all devices known therefor, the transfer of the individual objects from the multi-channel feeding to the further feeding transporting device creates tremendous difficulties, because one was forced to operate stepwise and to stop the individual feeding members at the moment of reception.

It is one object of the present invention to provide a method of releasing objects to a transportation device, wherein starting with the last feeding channel, seen in the direction of movement of the feeding member, an object is released to the feeding member from each of the feeding channel terminals, and the feeding member is advanced from the moment of reception of an object from a feeding channel up to the reception of an object from the adjacent feeding channel for a predetermined length, and wherein after release of an object from the first feeding channel, no further series of objects is transferred anymore to the feeding member until the object received from the first channel by the feeding member has passed the terminal of the last of the feeding channels.

It is another object of the present invention to provide a method of releasing objects to a transportation device, wherein the feeding member is moved with regular speed completely continuously or also with comparatively small steps. By this arrangement, for example, the regular and non-interrupted feeding of a working machine further working the objects, a manual working position, a packing machine or any other device is very much simplified.

Preferably, the arrangement is made such, that upon release of the last object of a series, a certain time period has passed, until this object received by the feeding member has passed by the terminal of the first feeding channel. During this time period means rendered now effective in a staggered arrangement for the individual release of the objects present in the feeding channel terminals, can be brought back into the starting position, so that they are again ready for operation, as soon as the transfer of the next series of objects can be started.

One can adjust also the distances between the objects moved in the single column from the feeding member by a corresponding selection of the transportation speed of the feeding member to the prevailing conditions and requirements.

It is yet another object of the present invention to provide an apparatus for releasing of objects to a transportation device, wherein the apparatus comprises a plurality of feeding channels for the objects, which feeding channels are equally spaced apart from and parallel to each other, as well as a feeding member arranged in front of the terminals of the feeding channels and extending over the range of all terminals, and also means disposed within the range of the feeding channel terminals and of the feeding member and rendered effective in a staggered arrangement for the individual release of the objects present in the feeding channel terminals to the feeding member, and finally also drive means for the further movement of the feeding member at least after each reception of an object by the feeding member.

With these and other objects in view which will become apparent in the following detailed description, the present invention, which is disclosed by example only, will be clearly understood in connection with the accompanying drawings, in which:

FIG. 1 is a simplified top plan view of the apparatus designed in accordance with the present invention; and FIG. 2 is a section along the lines 2—2 of FIG. 1.

Referring now to the drawings, it can be ascertained from FIG. 1, that the apparatus comprises totally five feeding channels 1, 2, 3, 4 and 5, disposed parallel towards each other and formed by immovable guide rails 6, 7, 8, 9, 10 and 11, the terminals of the feeding channels being arranged in a common straight line. It is to be understood, however, that also a larger or smaller number of feeding channels can be provided. Furthermore, the channel terminals can be arranged such, that they are provided along a circular line. The feeding channels serve simultaneously the transportation of objects 12, as for instance chocolate bars or the like, along a plurality of adjacent disposed paths. In order to render possible this transportation, two band conveyance systems are arranged one behind the other. The first band conveyance having a band 15, running over rollers 13 and 14, guides the objects 12 in five non-interrupted rows to a second band conveyance moving faster than the first band conveyance and the endless band 19 of which operates by means of rollers 16, 17 and 18. Due to the greater peripheral speed of the band 19 compared with that of the band 15, the objects 12 are drawn apart, so that between the latter distances are created in longitudinal direction. The feeding of the multi-channel transportation device is to take place such, that simultaneously one object is guided onto the band 15 for each channel. The exact arrangement of the objects is, however, not required.

The objects 12 guided in the described manner along the channels 1, 2, 3, 4 and 5 and the terminals of these channels are now to be transferred to a further feeding device, which transfers the objects to a single column. In the shown example, this feeding device includes in particular a toothed belt 20. The latter runs over a roller 22 and further deviation means (not shown). For the slip-free drive of the toothed belt or conveyor member 20 as well as for the drive of the conveyance bands 15 and 19 suitable driving means which are known are provided. A lengthy portion of the toothed belt 20 runs in front of the terminals of the channels 1, 2, 3, 4 and 5 and, in particular, in a direction parallel to a line connecting these terminals. The toothed belt 20 is equipped over its entire length in regular distances with drivers 23 formed as mere abutment members. Instead of these mere abutment members, one could also use automatically controlled driver tongues or the like, whereby the control of the opening- and closing- movements of the tongues can take place by immovable control rails, cams, etc. The distance between the abutment faces of two adjacent drivers should thereby be greater than the prevailing distance between the longitudinal center planes of two adjacent feeding channels. Preferably, the toothed belt 20 is driven continuously and with unchanged speed. It could be driven, however, intermittently and perform each time after the reception of an object a small step. The conveyor bands 15 and 19 constitute a feeder means for conveying the objects or pieces in the parallel rows defined by the guide rails.

Between the end of the upper length of the band 19 and the belt 20 extends an immovable table 24. It extends, on the one hand, below the extended guide rails 6, 7, 8, 9, 10 and 11 and, on the other hand, below the drivers 23 disposed exactly opposite the channel terminals. On one end side, the table 24 is equipped with a narrow extension 25. The objects released to the transportation device, that means to the drivers 23 of the belt 20 are thus displaced by the operation of the drivers on the table 24 and on the extension 25, respectively, in a direction perpendicular to the longitudinal direction of the channels 1, 2, 3, 4 and 5. For the readiness and preparatory alignment of a series of objects to be transferred in a staggered arrangement (that means one object each from each of the channels 1, 2, 3, 4 and 5) a rail or rake means 26 or a collection gate (omitted in FIG. 1 for the purpose of better showing) is guided by drive means of a known type in such manner translatorily along the movement path indicated in FIG. 2 in point-dotted lines, that the rail 26 equipped with vertical slots in view of the guide rails 6, 7, 8, 9, 10 and 11 grips in its lower state simultaneously all forwardmost objects arriving at the channel terminals, is accelerated and slideswith increased speed onto the table 24.

For the individual and stepwise transfer of a series of momentary resting objects 12 made ready by the rail 26, rams or similar members coordinated to about the channels 6, 7, 8, 9, 10 and 11 could be used, which members are operated by joint control means synchronized with the drive of the feeding member. In the shown example, five arms 29 secured to a rotatably mounted shaft 28 serves this purpose, the ends of the arms 29 being formed blade-like. The end pointsof these blade-arms are distributed along an imaginary screw line, which includes an angle of less than 360°. The arms 29, constituting inserted members and the shaft 28, constitute a transfer means for moving the cross-row momentary resting objects 12 individually and sequentially to the drivers 23.

In order to assure a non-objectionable cooperation of the described parts of the apparatus, it is necessary, to synchronize the movement rate of the translatorily movement rail 26 with that of the blade-arms 29 and that of the drivers 23. This can be brought about by a rigid take-off of the movements from a main driving member or by corresponding use of controls having photo-cells, and switches and the like. With advantage also the drives of both band conveyances are also synchronized with those of the remaining units. The entire apparatus can be controlled for example by a photo-cell, which determines at what time point a more or less aligned series of objects reaches a predetermined point in the vicinity of the deviation point of the band 19.

It is now assumed that by means of the rail 26, the first of the series of objects 12 arriving in at least approximately equal distances is gripped and slides onto the table 24 with a speed greater than the peripheral speed of the band and is simultaneously aligned. As soon as the last of the drivers transporting an object 12 passes by the terminal of the last channel 5, the shaft 28 starts rotation from the original position, whereby the object made ready at the terminal of the channel 5 is gripped and transported in front of the next free driver 23. During this time interval, the toothed belt 20 moves equally. Thereafter, one object is advanced in a staggered arrangement from the terminals of the channels 4, 3, 2 and 1 such, that successively the next 4 drivers receive an object and can further feed in a direction perpendicular to the longitudinal direction of the channels 1, 2, 3, 4 and 5. After the transfer of the last object of a series, the shaft 28 with the blade-arms 29 is brought again into the starting position. Furthermore, by means of the collection rail 26 a further series of objects is moved onto the table 24. Sufficient time is available therefor, since the next transfer of an object from the channel can take place anyway only, when the conveyor band section, which has received the previous series has passed by along the last channel 5.

The described examples offer in certain cases particular advantages, in case the feeding member conveying further the object in a one-column arrangement simultaneously a part of a working machine (packing-, improving-, filling- machine or the like) the terminals of the feeding channels can then be directly opposite of the receiving side of the machine. This variation appears first of all of interest in the case, when the feeding member, as has been mentioned above, in facultative form, moves in a circular path. It is then suitable under circumstances to arrange the channels terminating adjacent each other not in parallel, rather radially in relation to the geometrical rotary axis of a turning rotor of the working machine.

The described apparatus assures, even in case of a high working cadence, a careful treatment of the object 12.

While I have disclosed several embodiments of the present invention, it is to be understood that these embodiments are given by example only and not in a limiting sense.

I claim:

1. An apparatus for transporting sweet-goods pieces leaving a production machine in adjacent rows to a further working station which uses the pieces individually, comprising in combination
   a feeder means for conveying said pieces in several rows adjacent each other,
   a conveyor member extending crosswise to the conveying direction of said feeder means and disposed immediately in front of said feeder means,
   a plurality of drivers provided on said conveyor member in series one behind each other, and spaced apart from each other,
   a transfer means disposed between said feeder means and said conveyor member and having inserted members each adjacent one of said rows, respectively, and displacably set off relative to each other, and
   means for driving said feeder means, said conveyor member and said transfer means in such manner that said inserted members individually and one after another move said pieces, each in one of said rows, arriving in a foward-most cross row on said feeder means, to a position in front of said drivers of said conveyor member, respectively.

2. The apparatus, as set forth in claim 1, wherein said feeder means comprises two conveyor bands disposed one behind the other, and the foward-most of said conveyor bands in the conveyor direction of movement is driven with greater speed.

3. The apparatus, as set forth in claim 1, further comprising a plurality of longitudinally extending rails deposed above said feeder means and separating the adjacent rows of said sweet-goods pieces from each other.

4. The apparatus, as set forth in claim 1, wherein the distance of said drivers arranged one behind the other on said conveyor member is larger than the spacing of said rows from each other.

5. The apparatus, as set forth in claim 1, further comprising a transfer table disposed between said feeder means and said cross-wise extending conveyor member.

6. The apparatus, as set forth in claim 5, further comprising a rake means for simultaneously transferring all of said pieces of said foward-most cross-row onto said transfer table, and operating faster than the speed of said feeder means.

7. The apparatus, as set forth in claim 6, wherein said rake means is disposed above said transfer table and performs a translatory movement.

8. The apparatus, as set forth in claim 3, wherein said longitudinally extending rails separating said pieces from each other extend beyond said feeder means above said transfer table.

9. The apparatus, as set forth in claim 1, wherein said transfer means and said inserted members comprise a rotating shaft extending above said rows of sweet-goods pieces, and arms constituting said inserted members extending from said shaft and set off thereon.

10. The apparatus, as set forth in claim 9, wherein said arms are angularly set off relative to each other and the ends of said arms define a helical path.

11. The apparatus, as set forth in claim 6, further comprising
    a joint control means for adjusting relative to each other, and performing the operation, of said drive means in the working range of said inserted members and the drive of said rake means.

* * * * *